United States Patent
Krosta et al.

(10) Patent No.: US 7,179,030 B2
(45) Date of Patent: Feb. 20, 2007

(54) MACHINE TOOL

(75) Inventors: Carsten Krosta, Aalen (DE); Ralf Müllner, Ostfildern (DE); Stefan Hansch, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 0 days.

(21) Appl. No.: 11/341,134

(22) Filed: Jan. 27, 2006

(65) Prior Publication Data

US 2006/0188352 A1    Aug. 24, 2006

(30) Foreign Application Priority Data

Feb. 23, 2005   (EP)   ................................. 05003824

(51) Int. Cl.
*B23C 1/04*       (2006.01)
(52) U.S. Cl. .................. 409/235; 409/192; 408/53; 408/234
(58) Field of Classification Search ............. 409/235, 409/158, 192, 203, 213, 217, 202; 408/53, 408/42, 43, 234
See application file for complete search history.

(56) References Cited

U.S. PATENT DOCUMENTS

| | | | | |
|---|---|---|---|---|
| 3,977,804 A | * | 8/1976 | Kitagawa | 408/16 |
| 4,712,953 A | * | 12/1987 | Witzel et al. | 409/131 |
| 4,730,373 A | * | 3/1988 | Senoh | 29/26 A |
| 5,096,346 A | * | 3/1992 | Ueda | 409/203 |
| 5,699,598 A | | 12/1997 | Hessbrueggen et al. | |
| 5,839,323 A | * | 11/1998 | Line | 74/490.07 |
| 5,944,643 A | * | 8/1999 | Koelblin et al. | 483/55 |
| 6,066,078 A | * | 5/2000 | Koelblin et al. | 483/55 |
| 6,298,531 B1 | * | 10/2001 | Baumbusch et al. | 29/40 |
| 6,412,156 B1 | * | 7/2002 | Yunokawa et al. | 29/53 |
| 6,666,632 B1 | * | 12/2003 | Fioroni | 409/192 |
| 7,070,370 B2 | * | 7/2006 | Brooks | 409/138 |
| 2002/0131836 A1 | * | 9/2002 | Ferrari et al. | 409/212 |

FOREIGN PATENT DOCUMENTS

| | | |
|---|---|---|
| DE | 196 52 460 C1 | 2/1998 |
| DE | 201 18 456 U1 | 1/2002 |
| JP | 11-165211 A * | 6/1999 |
| SU | 1683960 A1 * | 10/1991 |

OTHER PUBLICATIONS

European Search Report dated Aug. 9, 2005 (3 pages) both in English and German.

* cited by examiner

*Primary Examiner*—Erica Cadugan
(74) *Attorney, Agent, or Firm*—Flynn, Thiel, Boutell & Tanis, P.C.

(57) ABSTRACT

A machine tool for machining workpieces includes a spindle group with at least two spindle arrangements placed alongside each other, each spindle arrangement possessing a spindle to receive a machining tool. Each spindle arrangement is guided on a guide arrangement in the direction of the axis of the respective spindle in a longitudinally sliding manner on a holding device or frame for the spindle group, each guide arrangement possesses an external clearance which is larger than the width of the respective spindle and that the guide arrangements of two directly adjacent spindle arrangements of the spindle group are arranged on mutually different sides of the holding device or frame so that the spindle axes are arranged closer together than in the case of an arrangement of the guide arrangements on the same side of the holding device or frame.

14 Claims, 5 Drawing Sheets

MACHINE TOOL

BACKGROUND OF THE INVENTION

The invention relates to a machine tool for machining workpieces comprising a spindle group with at least two spindle arrangements placed alongside each other, each spindle arrangement possessing a spindle to receive a machining tool.

THE PRIOR ART

Such a machine tool is manufactured by the assignee. The machine tool is for example suitable for turning, milling, drilling or the like. The adjacently placed spindles or, respectively, quills, render possible simultaneous machining of one or more workpieces. All spindles in a group of spindles are simultaneously advanced, for example in the direction of the spindle axes toward the workpieces or are horizontally and/or vertically shifted.

This is admittedly expedient for efficient and rapid machining of workpieces. However individual longitudinal adjustment of the separate spindles in the direction of their axes is not possible, something which would be convenient for example to allow for inaccuracies in the tool and/or workpiece, for producing holes of different depth or the like.

SHORT SUMMARY OF THE INVENTION

One object of the present invention in the case of a machine tool of the type initially mentioned is therefore to render possible a longitudinal adjustment of the spindles in the direction of the axis of the respective spindle in the group with a compact overall form and a small clearance between the spindle axes of adjacent spindle arrangements.

In order to achieve such aim in the case of a machine tool of the type initially mentioned there is a provision such that each spindle arrangement is guided on a guide arrangement in the direction of the axis of the respective spindle in a longitudinally sliding manner on a holding means for the spindle group, that each guide arrangement possesses an external clearance which is larger than the width of the respective spindle and that the guide arrangements of two directly adjacent spindle arrangements of the spindle group are arranged on mutually different sides of the holding means so that the spindle axes are arranged closer together than in the case of an arrangement of the guide arrangements on the same side of the holding means. The external clearance of the guide arrangements is preferably set by two guide rails of the respective guide arrangement.

In the case of the machine tool in accordance with the invention the quills or, respectively, the spindle arrangements and accordingly the spindles, are able to be shifted in the direction of the respective spindle axes so that individual machining of workpieces is possible. The guide rails of a guide arrangement lie relatively far apart and in any case farther apart than the width of the respective spindle. Accordingly such spindle is securely guided and attached to the holding means. Despite the guide rails being widely spaced spindle axes of adjacent spindle arrangements are arranged close together, because the respective guide arrangements are attached on different sides of the holding means. The adjacent spindle arrangements are therefore not arranged on the same side of the holding means but rather on different sides thereof, for example of side walls, of the holding means.

The adjacent spindle arrangements or, respectively, their guide arrangements are for example arranged on mutually facing sides of the holding means. The mutually facing sides may for example be opposite to one another or be at an angle to each other, for example at an obtuse angle, an acute angle or perpendicularly to each other. Preferably the mutually adjacent spindle arrangements in a spindle group are arranged on opposite sides of the holding means.

In the case of all the above mentioned possible designs of the machine tool the axes of the respectively adjacent spindle arrangement are closer together than in the case of an arrangement of the adjacent spindle arrangements on the same side of the holding means.

A design of the machine tool in accordance with the invention is particularly preferred, in the case of which the spindle arrangements are arranged in rows adjacent to each other. The spindle axes of the spindle arrangements then extend along a row axis or they are arranged close to such row axis. For instance in this case the spindles are arranged alternatingly on a first side of the holding means and on a second side, opposite to the first side, of the holding means and are able to be individually slid in the directions of their axes. The row axis preferably extends essentially horizontally or vertically, an oblique setting also being quite possible.

Between the guide rails of each guide arrangement there is preferably a drive means for the respective spindle in the direction of the spindle axis. The wide clearance between the guide rails creates a comparatively large installation space for the drive means. Preferably this drive means is a linear drive or comprises a linear drive.

The linear drive is preferably constituted by an electric motor, a primary part of the linear motor being arranged on the spindle and a secondary part being arranged between the guide rails or vice versa. The primary part for example comprises windings using which an travelling magnetic field may be produced. The secondary part is preferably constituted by magnetic plates. The primary and/or the secondary part of the electric linear motor are preferably placed between the respective guide rails of a respective guide arrangement.

An alternative drive design for the individual longitudinal shift of a spindle arrangement in the direction of its spindle axis may also provide a lead screw, as for example a circulating ball drive.

The holding means, for example the holding frame, is preferably mounted on a basic frame of the machine tool for sliding or travelling in at least one direction athwart the spindle axes, for example vertically and/or horizontally. When the spindle axis direction corresponds to a Z axis of the machine tool, the holding means on the basic frame is able to be shifted or to travel in the X direction and/or the Y direction.

The holding means is best designed in the form of a vertical carriage or a horizontal carriage or is arranged on such a carriage, which is able to be shifted vertically or, respectively, horizontally on the basic frame. The basic frame preferably possesses a basic frame horizontal carriage or a basic frame vertical carriage, which is able to be moved in relation to a base part of the machine tool, as for example a machine bed, in a horizontal or, respectively, vertical direction. On the basic frame horizontal carriage or the basic frame vertical carriage the holding means is preferably able to be shifted vertical or, respectively, horizontally.

It is particularly preferred for the machine tool in accordance with the invention to have a general concept applicable to the holding means and preferably also to the basic frame or, respectively, to the carriages of the basic frame, for example the basic frame horizontal or vertical carriage. Accordingly a frame in frame configuration or, respectively, box in box design is appropriate, i. e. the frames are telescoped into one another.

For instance the holding means is constituted by a holding frame in which the spindle group is arranged. The frame has a high degree of strength and surrounds the spindle arrangements of the spindle group. This holding frame is also preferably arranged to be vertically or horizontally shifted on the frame-like basic frame horizontal or vertical carriage. The basic frame horizontal or vertical carriage is for its part arranged for shifting movement on a basic frame in a horizontal or, respectively, vertical direction.

A particularly advantageous concept for the machine tool in accordance with the invention may provide for two or more spindle groups in accordance with the invention of which the respective spindles are arranged on mutually opposite sides of a holding means, associated with the respective spindle group. The spindle axes of each such spindle group are preferably arranged adjacent to each other in the row direction. Preferably the spindle axes of all spindle groups, which are able to be slid or shifted in relation to each other, are arranged in this row direction adjacent to each other. It will be clear that different row directions are also possible, for example so that the spindle axes of a first spindle group in accordance with the invention lie horizontally adjacent to each other and that the spindle axes of a second spindle group in accordance with the invention lie vertically adjacent to one another.

Further advantageous developments and convenient forms of the invention will be understood from the following detailed descriptive disclosure of embodiments thereof in conjunction with the accompanying drawings.

DETAILED ACCOUNT OF WORKING EMBODIMENTS OF THE INVENTION

Figure 1:
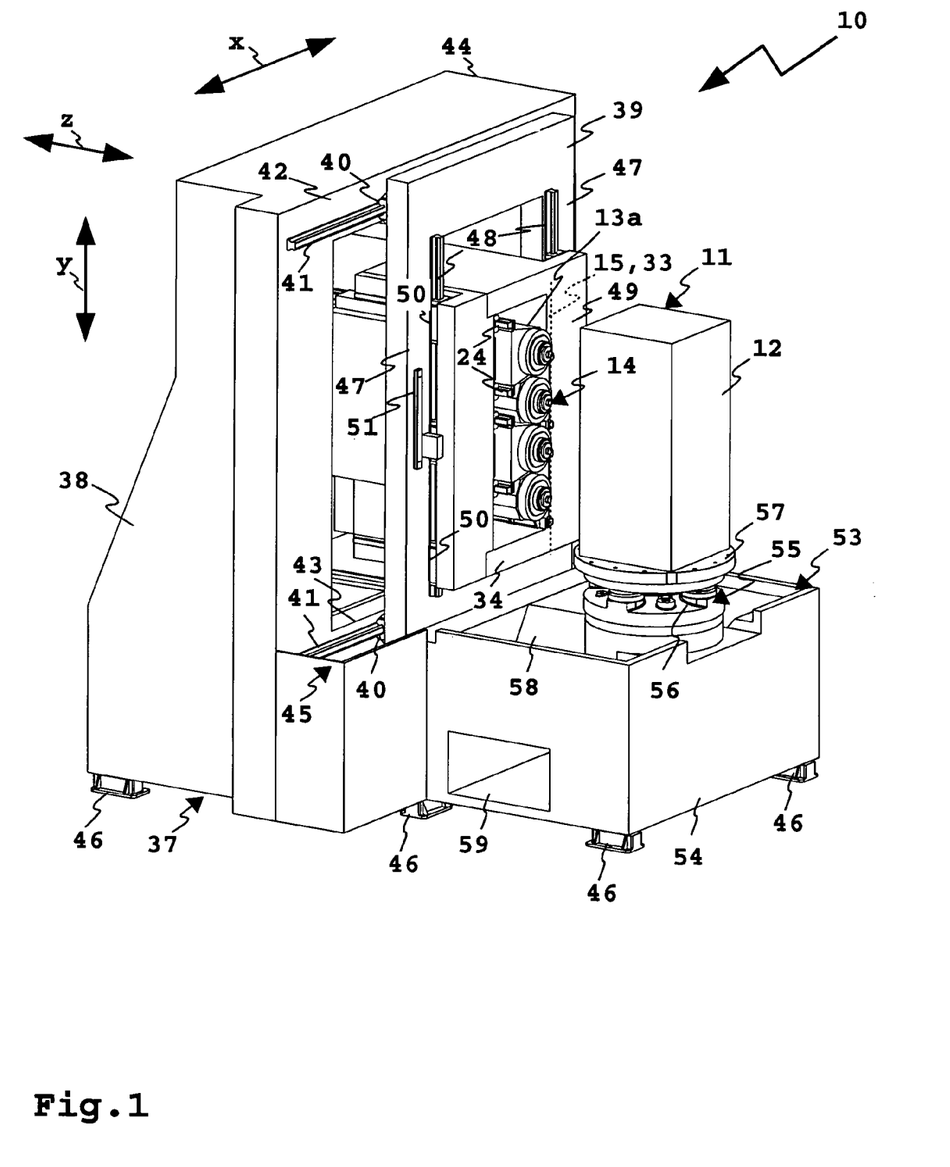
FIG. 1 shows a first working example of a machine tool in accordance with the invention with vertically superposed spindle arrangements or quills.

A machine tool 10 in FIG. 1 is designed for machining workpieces 11 held by a workpiece holder or workpiece carrier 12. The machine tool 10 is a multi-spindle machine comprising several—in the present case four—quills or spindle arrangements 13a through 13d in a spindle group 14. The spindle arrangements 13a through 13d are juxtaposed in a row direction 15 and in the machine tool 10 vertically superposed.

The spindle units or spindle arrangements 13a through 13d respectively each have a spindle 17 arranged in a spindle housing 16 and able to be driven by a motor, not illustrated in the figure, which is for example integrated in the spindle 17 or is arranged behind the spindle 17. As a matter of principle spindle arrangements, arranged in accordance with the invention, are possible in the case of which the spindle housing of a spindle arrangement comprises two spindles.

On a respective spindle head 18 and at a front end adjacent to the workpieces 11, of a spindle shaft 19 of a spindle arrangement 13a through 13d a tool, not illustrated, for example a drill, a milling tool or some other tool for machining the workpieces 11 is able to be gripped, for example in workpiece receiving means 20 on the spindle heads 18.

The spindle arrangements 13a through 13d are movably mounted on guide arrangements 21 for longitudinal shifting in the direction of the axes 22 of the spindles 17, i. e. in a Z direction, on a holding means 23. Accordingly the spindles 17 may be positioned individually in the direction of their axes 22, that is to say in the Z direction of the machine tool 10 forward or backward toward the workpieces 11 or, respectively, away from the same.

Each guide arrangement 21 comprises two guide rails 24 for guide elements 25 to run on. In the present case the guide rails 24 are arranged on the spindle housings 16 and the guide elements 25 are arranged on the holding means 23, a reversed arrangement also being possible. The guide rails 25 are respectively arranged laterally to the outside on a floor or base side 26 of the spindle housings 16. The base side 26 is wider than the spindle 17. The external clearance 27 of the guide rails 24 is larger than the width 28 of the spindle 17. Accordingly the spindle arrangements 13a through 13d are reliably secured to the holding means 23 and guided by same. Furthermore, there is a sufficiently large space for the incorporation of a drive means 29, for example in the form of a linear drive or, respectively, an electrical linear motor 30.

However there is the disadvantage that owing to the large external clearance 27 or, respectively, the width of the guide arrangement 21 the spindle arrangements 13a through 13d and accordingly the spindle axes 22 must be placed at a great distance apart. In order to tackle this set of problems in the machine tool 10 the spindle arrangements 13a through 13d are arranged on mutually different sides 31 and 32 of the holding means 23, in the present case on oppositely placed sides.

Figure 2:
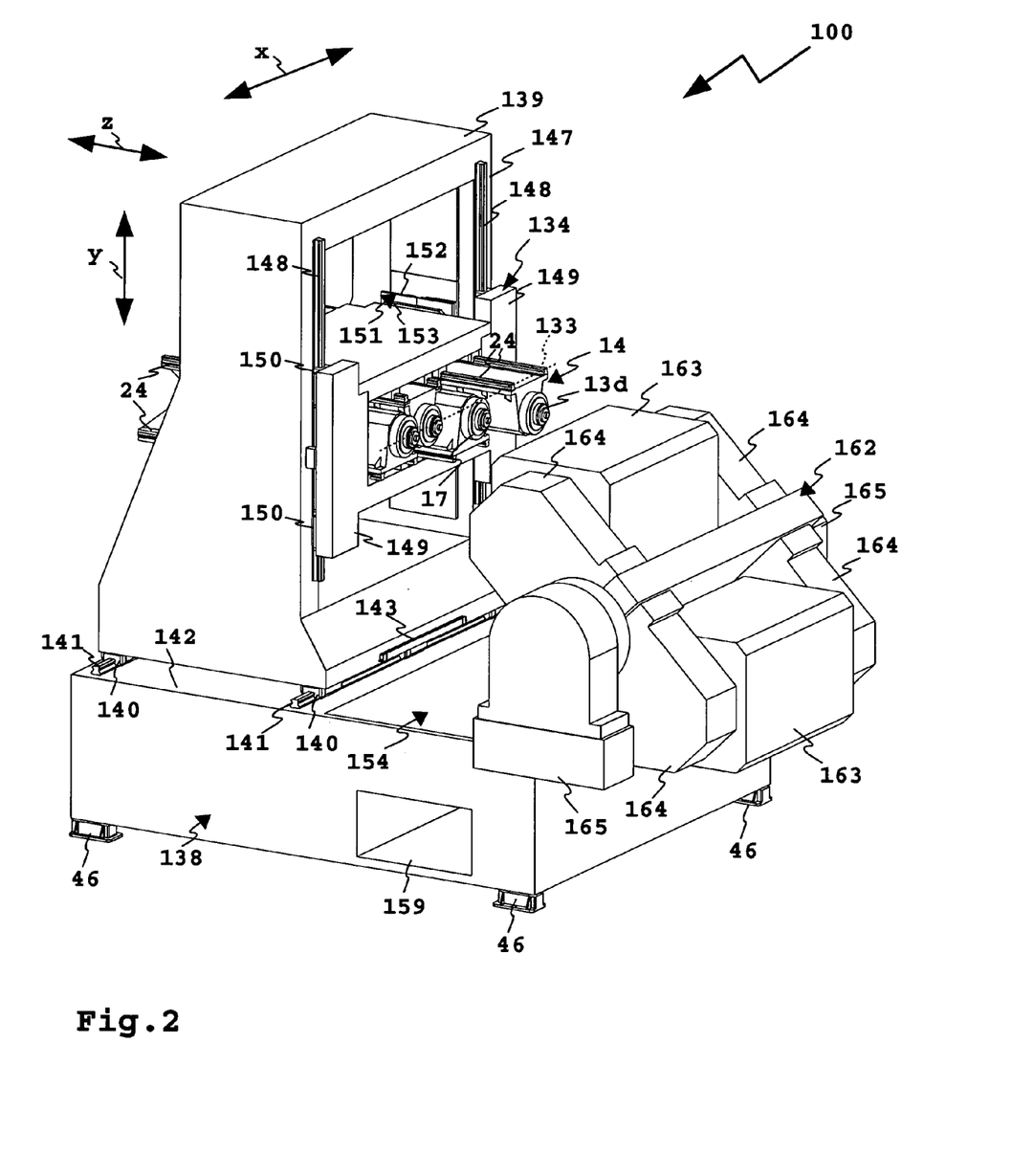
FIG. 2 shows a second working example of a machine tool in accordance with the invention having horizontally juxtaposed spindles of a spindle group.
Figure 3:
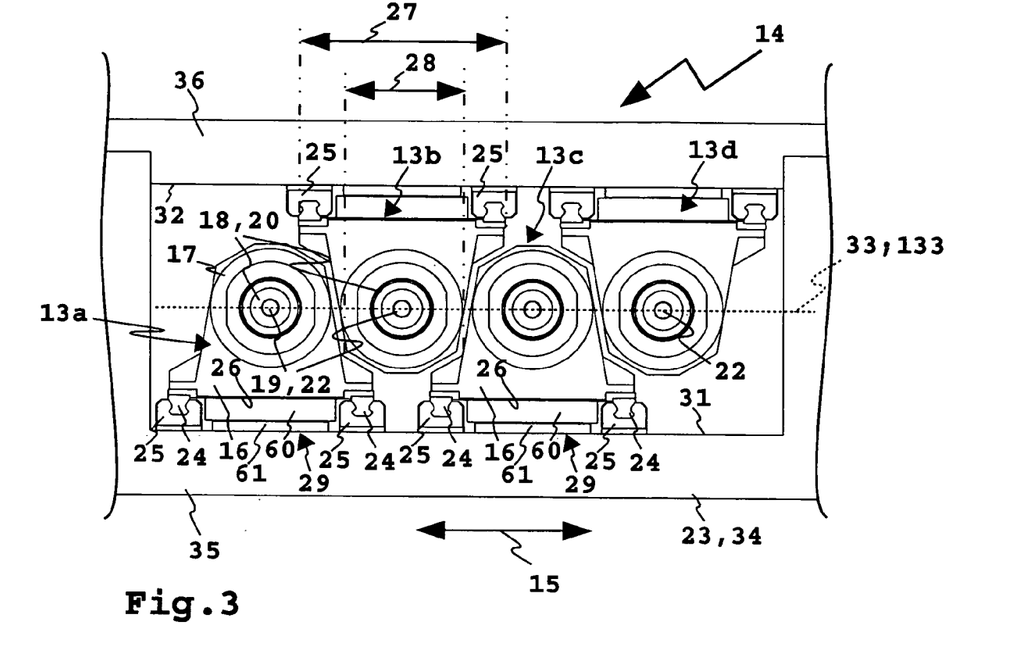
FIG. 3 shows a spindle group of the machine tool in accordance with FIG. 1 or 2 with four spindle arrangements in detail.

The spindle arrangements 13a through 13d are alternatingly arranged on the side 31 and the side 32 so that the spindle axes 22 extend vertically, or in the case of a machine tool 100 according to FIG. 2, horizontally in a juxtaposed fashion. The spindle arrangement 13b is for example positioned between the spindle arrangements 13a and 13c, the alternating arrangement as indicated by the arrow meaning that on the sides 31 and 32 of the holding means 23 the respective spindle axes 22 are closer together, i. e. in the present case they are less far apart in the row direction 15 than in the case of the row arrangement, not illustrated in the figure, of the spindle arrangements 13a through 13d on the same side of the holding means 23.

The electric linear motors 30 are relatively flat in their overall space requirement but are comparatively wide as regards space required for installation. In the case of electric motors there is a relationship between dimensions and power so that owing to the configuration in accordance with the invention of the spindle group 14 or, respectively, the arrangement of the spindles 17 within the group 14 on opposite sides 31 and 32 of the holding means 23 there is a larger space for the accommodation of the linear motors 30 and same are correspondingly efficient and fast. A respective primary part 60 of a linear motor 30 is arranged at the bottom base side 26 of the spindle housing 16. The primary part 60 f. i. comprises electrical windings. A secondary part, associated with the primary part 60, in the present case in the stator of the linear motor 30, is arranged between the guide rails 24. The secondary part 61 comprises magnetic plates for example.

The holding means 23 is designed in the form of a holding frame 34 in which the spindle arrangements 13a through 13d are placed. The sides 31 and 32 are for instance the inner sides of mutually facing side walls 35 and 36 of the very strong and twist-resistant holding frame 34.

The holding frame 34 is mounted on a machine bed (which has feet 46) or basic frame 37 of the machine tool 10 in a vertically and horizontally movable manner.

On such a tower-like basic frame 38 of the basic frame 37 a horizontal carriage runs at the front for horizontal motion, i. e. in the X direction or coordinate. On the horizontal carriage 39 the holding frame 24 runs vertically following an Y direction for setting so that the holding frame 34 constitutes a vertical carriage. On the rear side of the horizontal carriage 39 guide elements 4, arranged at the top and at the bottom, run on horizontal rails 41 arranged on a top and on a bottom transverse beam 42 and 43 of the basic frame 38 at the front. At the transverse beams 42 and 43 the horizontal carriage 39 covers over the basic frame 38 and accordingly can be optimally supported on same. Drive means, not illustrated in the drawing, and preferably in the form of linear motors, serve to shift the horizontal carriage 39 in relation to the basic frame 38. These drive means are also, just like the drive means 29 and further drives of the machine tool 10, controlled by a control, not illustrated, as for example a numerical control, a memory programmable control or the like.

On the bottom front side of the basic frame 38 a sort of guard cover 45 is arranged, behind which the bottom horizontal rail 41 is arranged and which covers the bottom portion of the horizontal carriage 39. Behind the cover 45 there is for example a receiving trough for shavings produced during machining.

The holding frame 34 is mounted in the horizontal carriage 39 and extends in the Z direction into the basic frame 38. On the lateral vertical beams 47 of the horizontal carriage 39 at the front vertical rails 48 are provided for vertically guiding the holding frame 34. At the vertical rails 48 front lateral sections 49 of the holding frame overlap the vertical rails 48. On such sections 49 guide elements are arranged to the rear that run on the vertical rails 48. Accordingly the holding frame 34 can also be supported from the front on the horizontal carriage, something which contributes to the stability of the arrangement. The horizontal carriage 39 is able to be driven vertically by means of drive means, for example linear motors. A displacement measuring system 51 serves to find the respective vertical position of the holding frame 34.

The side walls 35 and 36 extend to the rear near the basic frame 38 so that with the aid of the guide arrangements 21 a substantial displacement path is made possible for the spindle 17 in the Z direction.

The workpieces are held ready at a machining station 53 in the front part of the machine tool 10. In the case of the machining station 53 basically any desired design is possible, as will become clear later in connection with the machine tool 100 in accordance with FIG. 2.

In the case of the machining station 53 of the machine tool 10 a workpiece table 55, for example in the form of a turntable, is arranged in a receiving box 54 for the residues of machining such as metal shavings or the like. Instead of the workpiece table 55 an arrangement with two workpiece tables could for example be provided attached to a pivoting arm, such tables alternatingly being pivoted into the area with the receiving box 54, the workpieces 11 on the outwardly swung workpiece table being replaced by others. On the workpiece table 55 at the top attachment means 56 are present on which in the working embodiment a palette 57 is secured, for example by screw means. On the palette 57 or, respectively, the workpiece table 55 the workpiece holder 12, which is in the present case is tower-like or cabinet-like, is mounted. Instead of having the workpiece holder 12 it is also possible for a workpiece to be directly secured to the palette 57 or the workpiece table 55 so that such workpiece may be simultaneously or sequentially machined with the aid of the spindles 17. In this case the depth of machining in the Z direction is able to be individually set, because the spindles 17 may be shifted in the Z direction by means of the guide arrangements 21. Accordingly for example manufacturing inaccuracies as well are also able to be allowed for, which are caused by, for example, workpieces with a different nature, tools, tool wear or the like.

Shavings or the like produced during the machining of workpieces 11 may be disposed of in removal troughs 58 toward a shavings removal channel 59, said troughs being formed by suitable oblique walls of the receiving box 53. In the shavings removal channel 59 a shavings removal belt, not illustrated in the figure, may be arranged.

The machine tool 100 according to FIG. 2 comprises components partially similar to the component of the machine tool 10 so that identical or similar components in the machine tool 10 will not be described in detail in the following and have the same reference numerals. More particularly in the case of the machine tool 100 as well a spindle group 14 is provided with spindle arrangements 13a through 13d in accordance with the invention, albeit with the difference that the row direction 15 and, respectively, the row axis 33 are not vertical but horizontal. FIG. 2 makes it particularly clear that the spindles 17 are able to be shifted individually in the Z direction, that is to say toward the workpieces 11 and away from the same.

On a machine bed or basic frame 138 of the machine tool 100 in accordance with the invention a tower-like horizontal carriage 141 is able to be horizontally shifted or moved. The horizontal rails 141 are spaced apart in the Z direction of the machine tool 100 and extend in the X direction of the a top wall 142 of the basic frame 138 in the rear portion of the machine tool 100. On the bottom side of the horizontal carriage 139 guide elements 140 are arranged, which run on the horizontal rails 141. For horizontal shifting of the horizontal carriage 139 there is a drive, not illustrated, as for example a linear drive, which is arranged on the bottom side of the horizontal carriage 139 and, respectively, on the top wall 142 of the basic frame 138. A displacement measuring system 143 serves to find the horizontal position of the horizontal carriage 139 in relation to the basic frame 138.

On the horizontal carriage 139 a holding frame 134 is arranged as a holding means 23 in accordance with the invention for the spindle group 14 and is able to be moved or shifted vertically and forms a vertical carriage. The holding frame 134 extend in the Z direction into the horizontal carriage 139 so that in the Z direction a comparatively long path of movement of the spindles 17 is possible with a reliable guiding action for the guide arrangements 21.

On vertical beams 147 of the horizontal carriage 139 vertical rails 148 are arranged at the front, which are at least partly covered by front lateral sections 149 of the holding frame 134. At the rear side of such sections 149 there is guides or guide elements 150, which run on the vertical rails 148. A vertical drive means 151 serves for vertically driving the holding frame 134 in relation to the horizontal carriage 139. The drive means 151 is for example a linear motor of the same kind as the linear motors 30, magnet plates 152 being placed in the present case on the inner side, facing the holding frame 134, of the vertical beams 147, which cooperate with a corresponding primary part 153 on the holding frame 34. A vertical displacement measuring system, not visible in the figure, serves to find the vertical position of the holding frame 134 in relation to the horizontal carriage 139.

In its front portion the basic frame 138 is designed in the form of a receiving box 154 for machining residues and more particularly metal shavings. In the bottom portion of the receiving box 154 a shavings removal channel 159 extends and in it a shavings removal belt may be arranged. The shavings removal channel 159 extends in parallelism to the horizontal row axis 133 of the spindles 17 and underneath the spindle 17.

A pivoting workpiece holder 162 arranged in front of the spindles 17 in the machining area serves for offering workpieces 11 for machining using the spindles 17. Two workpiece palettes or workpiece holders 163, which are orientated in the direction of the row axis 133 of the spindles 17 are rotatably mounted on pairs of pivotal arms 164. The pairs of pivotal arms 164 are mounted in a pivotal manner on lateral arm-like pivotal holders 165 which extend upwardly in the front region of the basic frame 138. Accordingly in an alternating fashion one of the workpiece holders 163 may be pivoted toward the spindles 17 so that the workpieces 11 located in the respective workpiece holder or, respectively, workpiece palette 163 may be machined using the spindle 17. On the workpiece holders 163 pivoted away from the spindles the workpieces 11 may be changed. Owing to the pairs of pivotal arms 164 and, respectively, holders 165, which constitute a pivotal arrangement, the workpiece holders or, respectively, palettes 163 may be angularly positioned in relation to the spindle group 14. On the four sides of the workpiece holders 163 respective workpieces 11 may be arranged.

It will be clear that instead of the workpiece holders 163 workpieces, not illustrated in the figure, may be mounted in a rotatable fashion directly on the pivotal arms 164. Furthermore it is possible for, as an example, for one of the pivotal workpiece palettes to be replaced by workpiece palettes so that automatic retooling is possible for the spindles 17.

In the following alternative arrangements in accordance with the concept of the invention will be presented.

Figure 4:
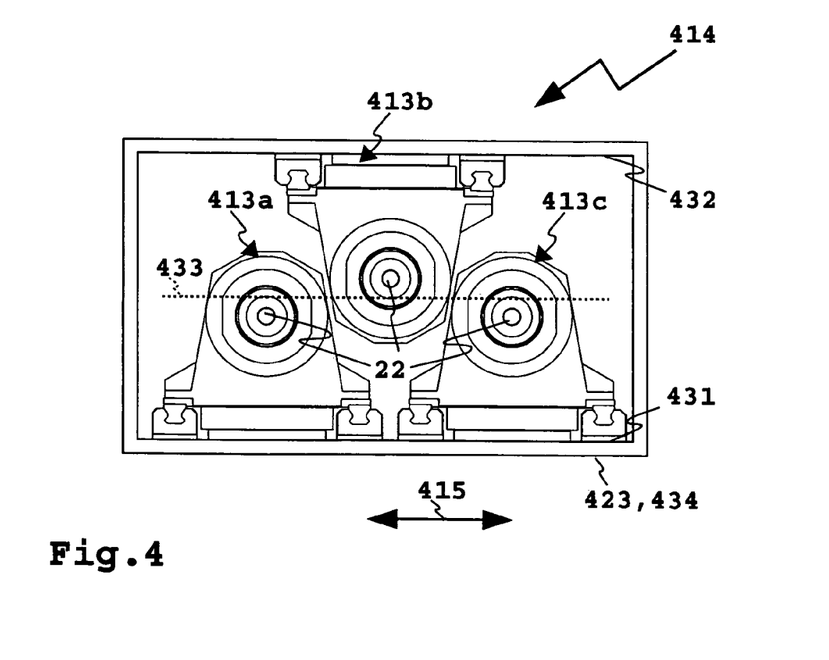
FIG. 4 shows an alternative to the spindle group according to FIG. 3 having three juxtaposed spindles in a spindle group designed in accordance with the invention.

In the case of one spindle group 414 in accordance with FIG. 4 spindle groups 413a through 413c are arranged adjacent to each other in a row direction 415. The design of the spindle arrangements 413a through 413c is the same as the design of the spindle arrangements 13a through 13d. The spindle arrangements 413a and 413c are arranged on a first side 431 of a holder means 423 designed in the form of a holder frame 434, whereas on the other hand the spindle arrangement 413b, positioned between the spindle arrangements 413a and 413c, is attached on a side 432 opposite to the side 431. Owing to the alternating arrangement of the spindle arrangements 413a through 413c on sides 431 and 432 of the holding means 423 the spindle axes 22 are closer together than is the case with an arrangement on the same side of the holding means 423. However, unlike the case of the preceding examples the spindle axes are not on a common row axis 433 of the spindle group 414 but rather alongside this row axis 433, for example alternating above and underneath the row axis 433. The spindle housings 16 are slightly conical as related to the base side 26 so that owing to present distance of the spindle axes 22 from the row axis 433 the row axis 433 the spindle axes 22 are arranged particularly together in the row direction 415.

Figure 5:
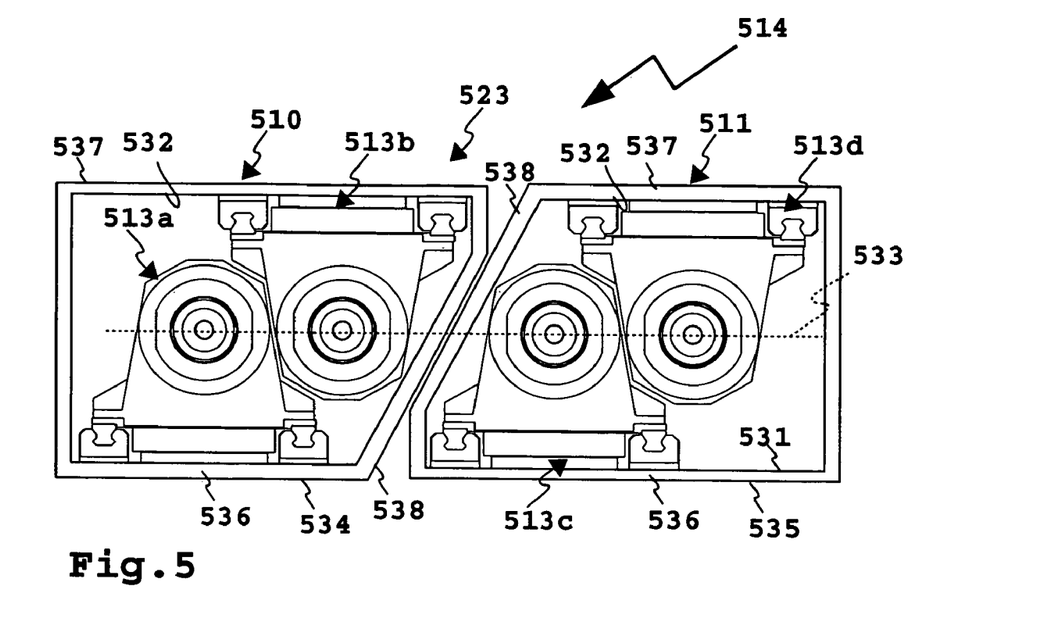
FIG. 5 shows two relatively movable spindle group parts in a spindle group in accordance with the invention in a first position, in which the group parts are placed close together.
Figure 6:
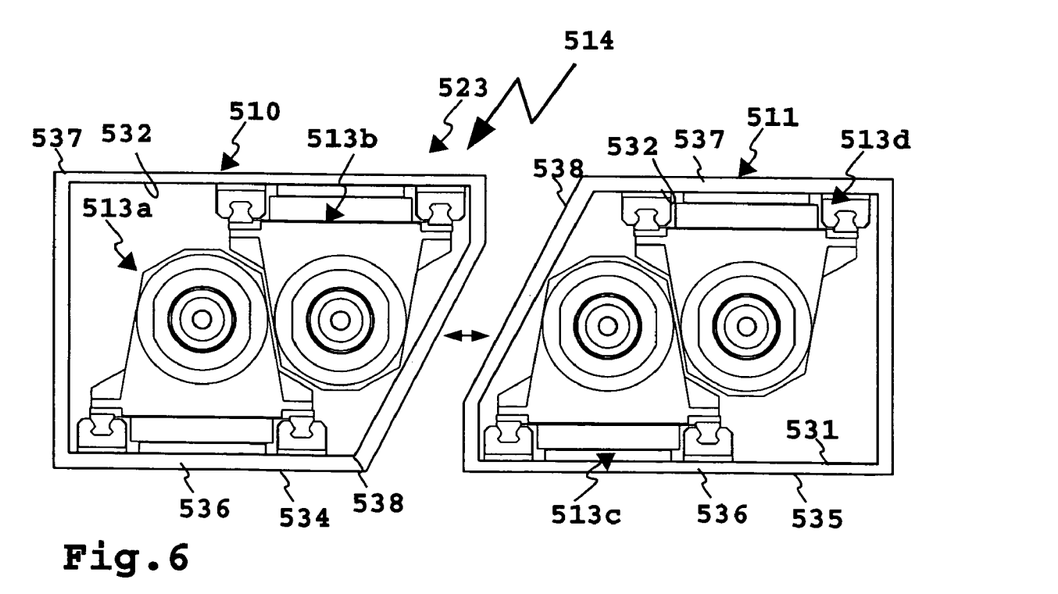
FIG. 6 shows the spindle group as in FIG. 5 in a position with the group parts moved away from each other.

In the case of a fourth working embodiment in accordance with FIGS. 5 and 6 one spindle group 514 in accordance with the invention is arranged in two group parts 510 and 511 and in the present case is divided up. In this case spindle arrangements 513a and 513b are arranged in a first holding frame 534 and spindle arrangements 513c and 513d are arranged in a second holding frame 535 of the holding means 523. The spindle arrangement 513a through 513d are placed on opposite sides 531 and 532 of the holding means 523 in an alternating fashion, the spindle axes 22 being arranged adjacent to each other in a row axis 533. The two holding frames 534 and 535 and therefore the group parts 510 and 511 are able to be slid in relation to each other, to wit in the present case along the row axis 533. In FIG. 5 the holding frames 534 and 535 are illustrated close to each other. In FIG. 6 the holding frames 534 and 535 are illustrated moved apart. For shifting the holding frames 534 and 535 preferably drive means, not shown, are provided. The spindle axes 22 of the spindle arrangements 513a and 513b and, respectively, 513c and 513d lie within the group parts 510 and, respectively, 511 in the row axis 533 close together, because the respective spindle arrangements 513a through 513d are arranged on opposite side walls 536 and 537 of the respective holding frames 534 and 535. However the spindle arrangements 513b and 513c, arranged in different group parts 510 and 511 may, as depicted in FIG. 5, be positioned close together in accordance with the invention, or at any rate closer together than in the case of an arrangement of the spindle arrangements 513b and 513c on the same side of the holding means 523. In order for the holding frames 534 and 535 to be positioned close together side walls 538 of the holding frames 534 and 535 extend adjacent to the spindle arrangements 538 of the holding frames 534 and 535 in accordance with the adjacent outer shape of the respective spindle housings 16 obliquely and accordingly allow a particularly close positioning of the spindle arrangements 513b and 513c.

It will be clear that as a modification of the working example in accordance with FIGS. 5 and 6 the spindle arrangements of group part may be arranged on a first side of the respective holding means and the spindle arrangements of a second group part may be arranged on a second side, different to the first side, of the holding means. As regards the working example in accordance with FIGS. 5 and 6 it would for example be possible for the spindle arrangements 513a and 513b to be arranged on a first side of the holding means and for the spindle arrangements 513c and 513d to be arranged on a second side opposite to the first side.

Moreover, in accordance with the invention a modular principle of design is possible. For instance, individual spindle arrangements, groups or group parts may in accordance with the invention be arranged on different sides of a holding means and preferably be able to be shifted in relation to each other.

Figure 7:
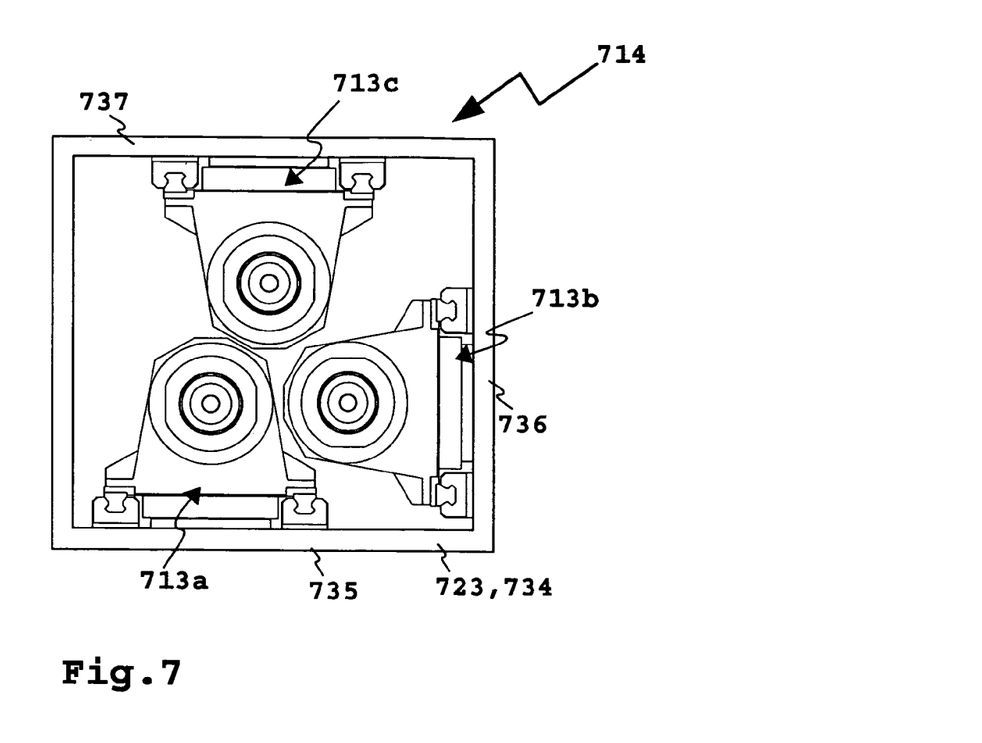
FIG. 7 shows a group in accordance with the invention of three different spindles arranged for example at three mutually perpendicular sides of a holding means.

In the case of one spindle group 714 according to FIG. 7 spindle arrangements 713a through 713c on mutually perpendicular side walls 735, 736 and 737 of a holding means 723 in the form of a holding frame 734 are arranged for longitudinal sliding in the direction of their respective spindle axes 22. The spindle arrangements 713a through 713c have the same design as the spindle arrangements 13a through 13d.

Figure 8:
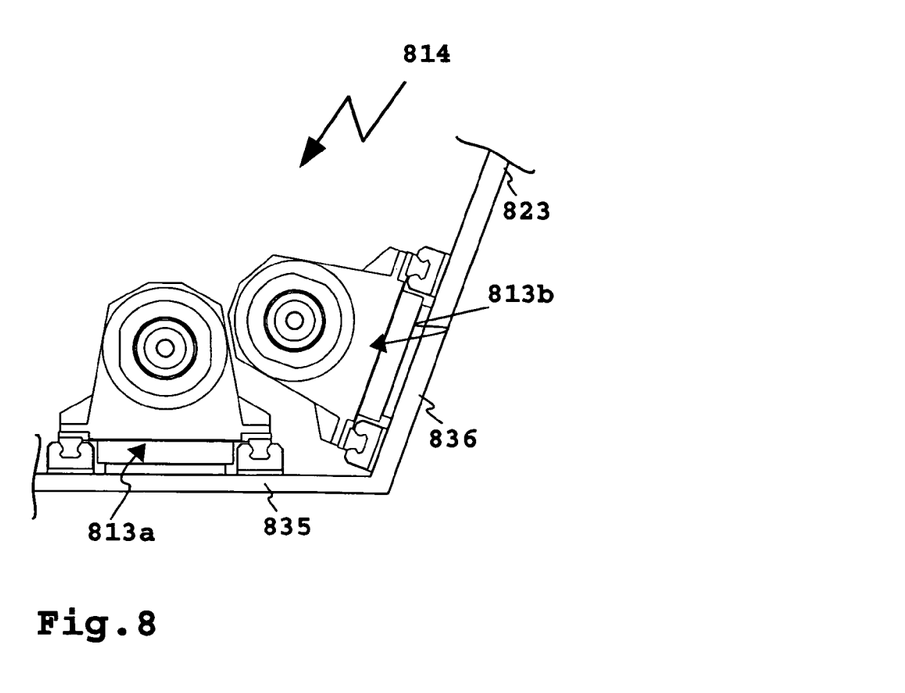
FIG. 8 shows a group with two spindles which are arranged on two sides of a holding means, said sides being arranged at an obtuse angle to one another.

In the case of one spindle group 814 according to FIG. 8 spindle arrangements 813a and 813b, whose design is the same as that of the spindle arrangements 13a through 13d, are mounted for longitudinal sliding motion on side walls 835 and 836, which are at an obtuse angle to one another, of a holding means 823 in the direction of their spindle axes 22.

In the case of the working examples in accordance with FIGS. 7 and 8 the spindle axes of the spindle arrangements 713 through 713c and, respectively, 813a and 813b are closer together than would be the case, if spindle arrangement were arranged on the same side of the associated holding means 723 and 823.

In the case of an alternative design of the spindle arrangements in accordance with the invention the component, associated with spindle, could also be directly attached to the spindle so that a spindle housing, as in the other working examples, would not be necessary. For instance in this case the guide rails 24 would be directly secured to the spindles 17, for example by screw means, by welding, by bonding or the like.

The invention claimed is:

1. A machine tool for machining workpieces, said machine tool comprising a spindle group with at least two spindle arrangements placed laterally alongside each other, each spindle arrangement possessing a spindle to receive a machining tool, wherein each spindle arrangement is guided on a guide arrangement in the direction of the axis of the respective spindle in a longitudinally sliding manner on a holding means for the spindle group, each guide arrangement possesses a maximum external clearance which is larger than the width of the respective spindle and that the guide arrangements of two directly adjacent spindle arrangements of the spindle group are arranged on mutually different sides of the holding means such that the spindle rotational axes are arranged substantially parallel and close together at a close fixed distance, which distance is closer than would be possible in the case of an arrangement of the guide arrangements on the same side of the holding means.

2. The machine tool as set forth in claim 1, wherein each guide arrangement possesses two guide rails whose distance apart defines the maximum external clearance of the guide arrangement.

3. The machine tool as set forth in claim 1, wherein the mutually different sides of the holding means are opposite to each other.

4. The machine tool as set forth in claim 3, wherein the at least two spindle arrangements are arranged like rows adjacent to one another, the spindle axes being arranged in a row axis or close to a row axis alongside each other.

5. The machine tool as set forth in claim 4, wherein the row axes extend substantially horizontally or vertically.

6. The machine tool as set forth in claim 1, wherein the mutually different sides of the holding means are set at an angle to each other.

7. The machine-tool as set forth in claim 1, wherein between guide rails of a respective guide arrangement, a drive is arranged for driving the respective spindle in the direction of the spindle axis.

8. The machine tool as set forth in claim 7, wherein the drive comprises a linear drive.

9. The machine tool as set forth in claim 8, wherein the linear drive comprises a primary part and/or a secondary part of the linear motor between the guide rails of a respective guide arrangement.

10. The machine tool as set forth in claim 1, wherein the holding means comprises or constitutes a holding frame for the spindle group.

11. The machine tool as set forth in claim 1, comprising a basic frame for holding the holding means and wherein the holding means is mounted for sliding motion on the basic frame in at least one direction athwart the spindle axes.

12. The machine tool as set forth in claim 11, wherein the holding means is arranged in a vertically shiftable fashion on a horizontally moving horizontal carriage of the basic frame or is arranged in a horizontally shiftable fashion on a vertically moving vertical carriage of the basic frame.

13. The machine tool as set forth in claim 1, wherein the spindle group is able to be slid in relation to a second such spindle group or in relation to a spindle arrangement of the machine tool.

14. The machine tool as set forth in claim 1, wherein the mutually different sides of the holding means are set perpendicularly to each other.

* * * * *